(12) United States Patent
Martin et al.

(10) Patent No.: US 10,994,232 B2
(45) Date of Patent: May 4, 2021

(54) FILTER DEVICE AND SYSTEM AND CLOGGING MONITORING METHOD

(71) Applicant: SAFRAN FILTRATION SYSTEMS, Nexon (FR)

(72) Inventors: Jérôme Martin, Nexon (FR); Raluca-Liliana Pinon, Nexon (FR); Adrien Massonnaud, Nexon (FR)

(73) Assignee: SAFRAN FILTRATION SYSTEMS, Nexon (FR)

( * ) Notice: Subject to any disclaimer, the term of this patent is extended or adjusted under 35 U.S.C. 154(b) by 50 days.

(21) Appl. No.: 16/250,707

(22) Filed: Jan. 17, 2019

(65) Prior Publication Data
US 2019/0217228 A1  Jul. 18, 2019

(30) Foreign Application Priority Data

Jan. 17, 2018 (FR) ...................................... 1850384

(51) Int. Cl.
*B01D 35/143* (2006.01)
*B01D 29/52* (2006.01)
(Continued)

(52) U.S. Cl.
CPC ........... *B01D 35/143* (2013.01); *B01D 29/15* (2013.01); *B01D 29/21* (2013.01); *B01D 29/23* (2013.01);
(Continued)

(58) Field of Classification Search
CPC .... B01D 35/143; B01D 29/21; B01D 35/157; B01D 29/52; B01D 29/606; B01D 29/603;
(Continued)

(56) References Cited

U.S. PATENT DOCUMENTS 2,942,572 A * 6/1960 Pall .......................... G01L 19/12
116/267
3,283,902 A * 11/1966 Farris et al. ......... B01D 35/143
210/90
(Continued)

FOREIGN PATENT DOCUMENTS

EP   2638946 A1   9/2013
FR   2975015 A1   11/2012
(Continued)

OTHER PUBLICATIONS

Preliminary Research Report received for French Application No. 1850384, dated Oct. 23, 2018, 4 pages (1 page of French Translation Cover Sheet and 3 pages of original document).

*Primary Examiner* — Madeline Gonzalez
(74) *Attorney, Agent, or Firm* — Womble Bond Dickinson (US) LLP

(57) ABSTRACT

The invention relates to a particle filter device (1) comprising:
  a fluid inlet (20),
  a fluid outlet (21),
  a first fluid flow circuit (31) comprising a first filter zone (2) having a first filter surface ($S_1$),
  a second fluid flow circuit (32) comprising a second filter zone (3) having a second filter surface ($S_2$) and a constriction (4) having a constant hydraulic resistance so that, in operation, a first portion of the fluid flows through the first flow circuit (31) by passing through the first filter zone (2) and a second portion of the fluid flows through the second flow circuit (32) by passing through the second filter zone (3) and the constriction (4), and the first filter zone (2) reaches a predetermined clogging condition before the second filter zone (3).

20 Claims, 6 Drawing Sheets

(51) Int. Cl.
*B01D 29/60* (2006.01)
*B01D 35/157* (2006.01)
*B01D 29/54* (2006.01)
*B01D 29/15* (2006.01)
*B01D 29/23* (2006.01)
*B01D 29/21* (2006.01)

(52) U.S. Cl.
CPC .............. *B01D 29/52* (2013.01); *B01D 29/54* (2013.01); *B01D 29/603* (2013.01); *B01D 29/606* (2013.01); *B01D 29/608* (2013.01); *B01D 35/157* (2013.01); *B01D 35/1576* (2013.01)

(58) Field of Classification Search
CPC .... B01D 29/23; B01D 35/1576; B01D 29/54; B01D 29/15; B01D 29/608; B01D 29/50; B01D 33/35; B01D 35/14; B01D 27/14; B01D 27/142; B01D 27/144; B01D 29/0047; B01D 29/0054; B01D 29/005

USPC ......... 210/335, 314, 320, 90, 103, 111, 488, 210/253, DIG. 13
See application file for complete search history.

(56) References Cited

U.S. PATENT DOCUMENTS

| | | |
|---|---|---|
| 4,422,790 A | 12/1983 | Gebert et al. |
| 2003/0106847 A1* | 6/2003 | Sann ..................... B01D 29/15 210/130 |

FOREIGN PATENT DOCUMENTS

| | | |
|---|---|---|
| WO | 02/07856 A1 | 1/2002 |
| WO | 2016/010973 A1 | 1/2016 |

\* cited by examiner

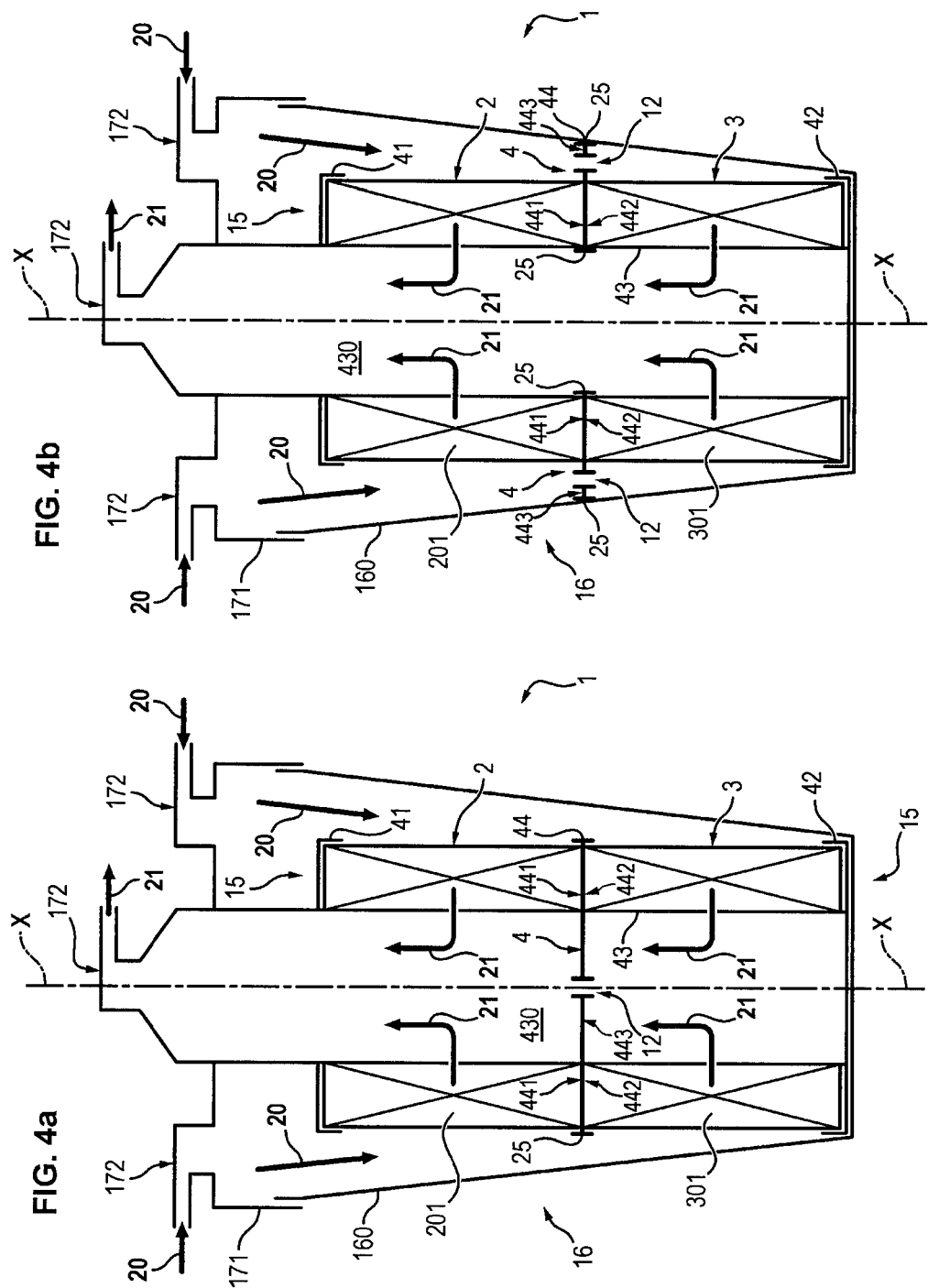

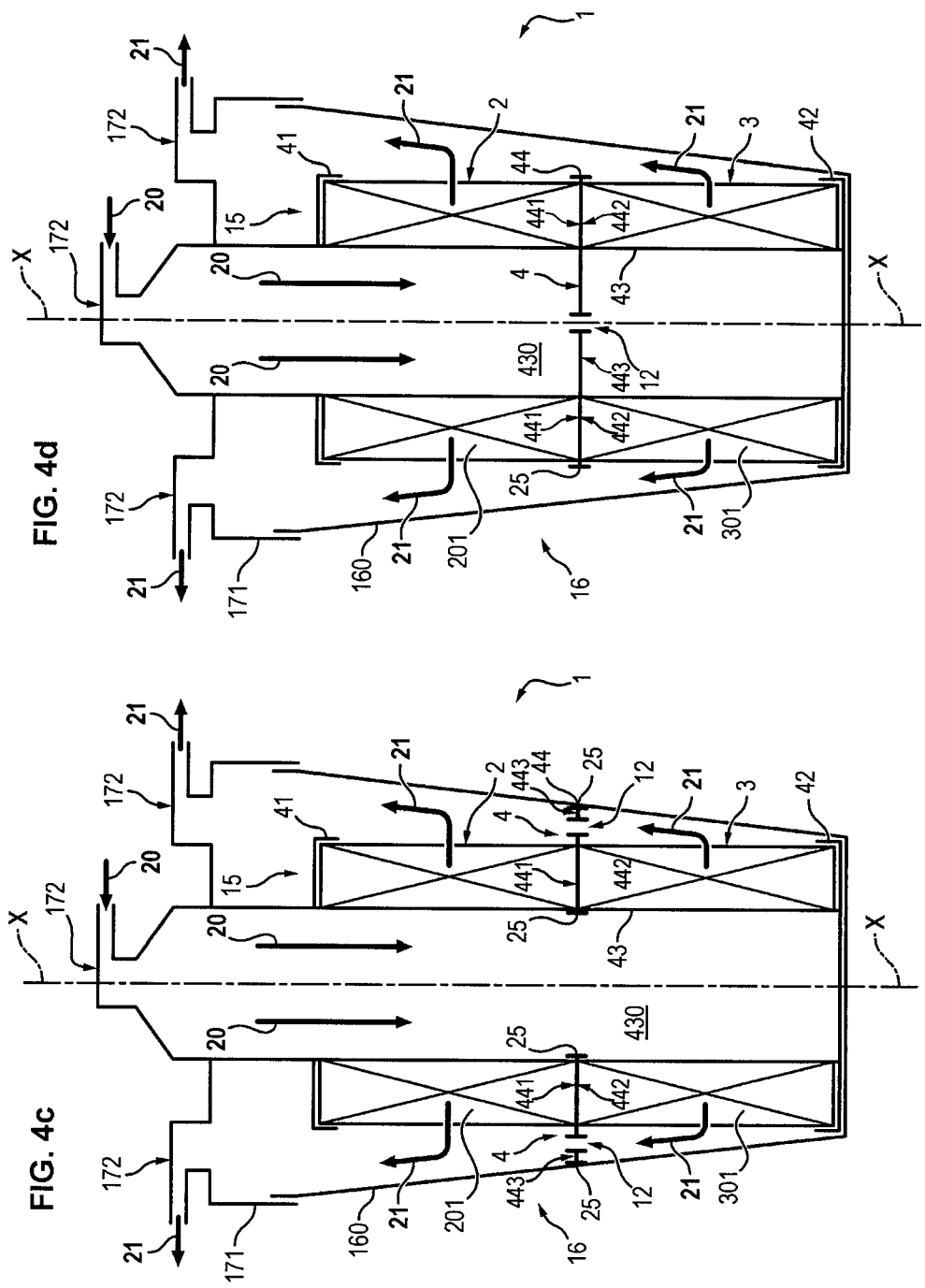

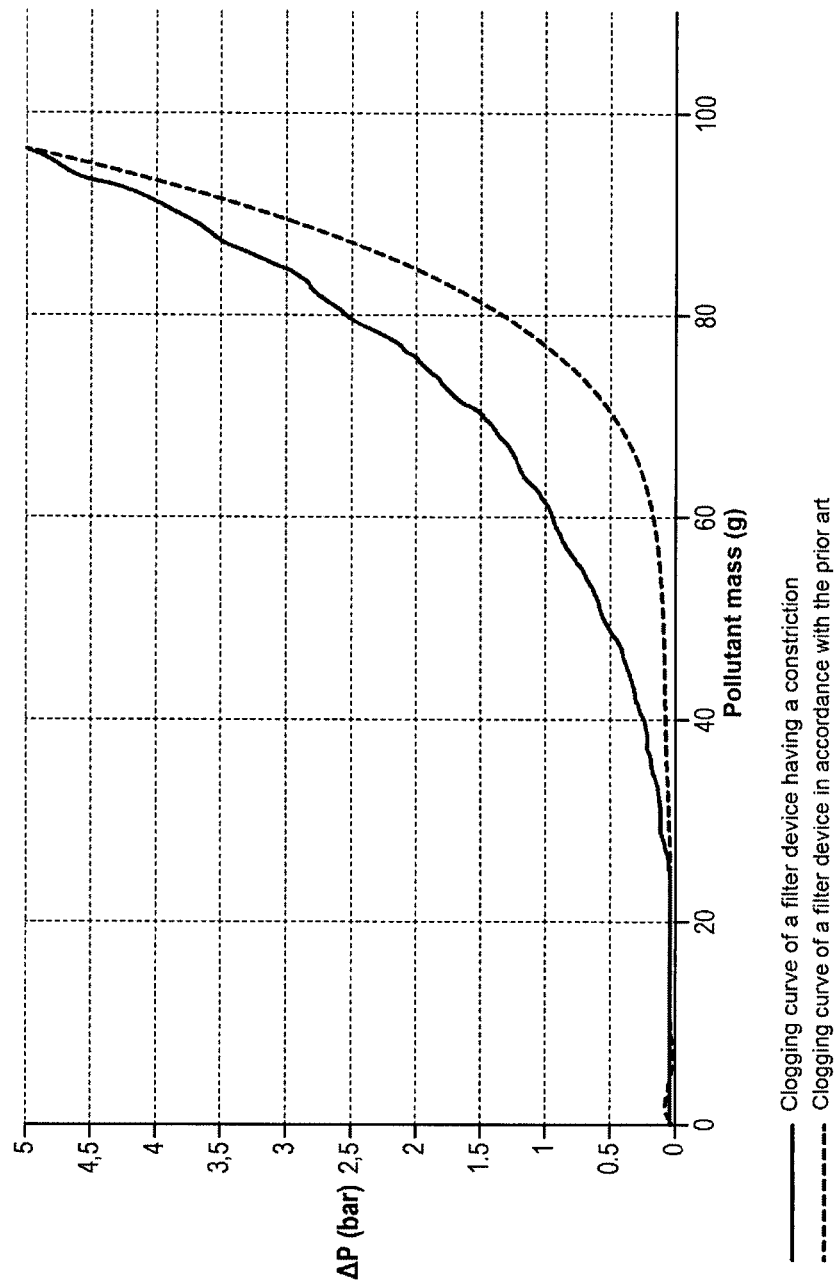

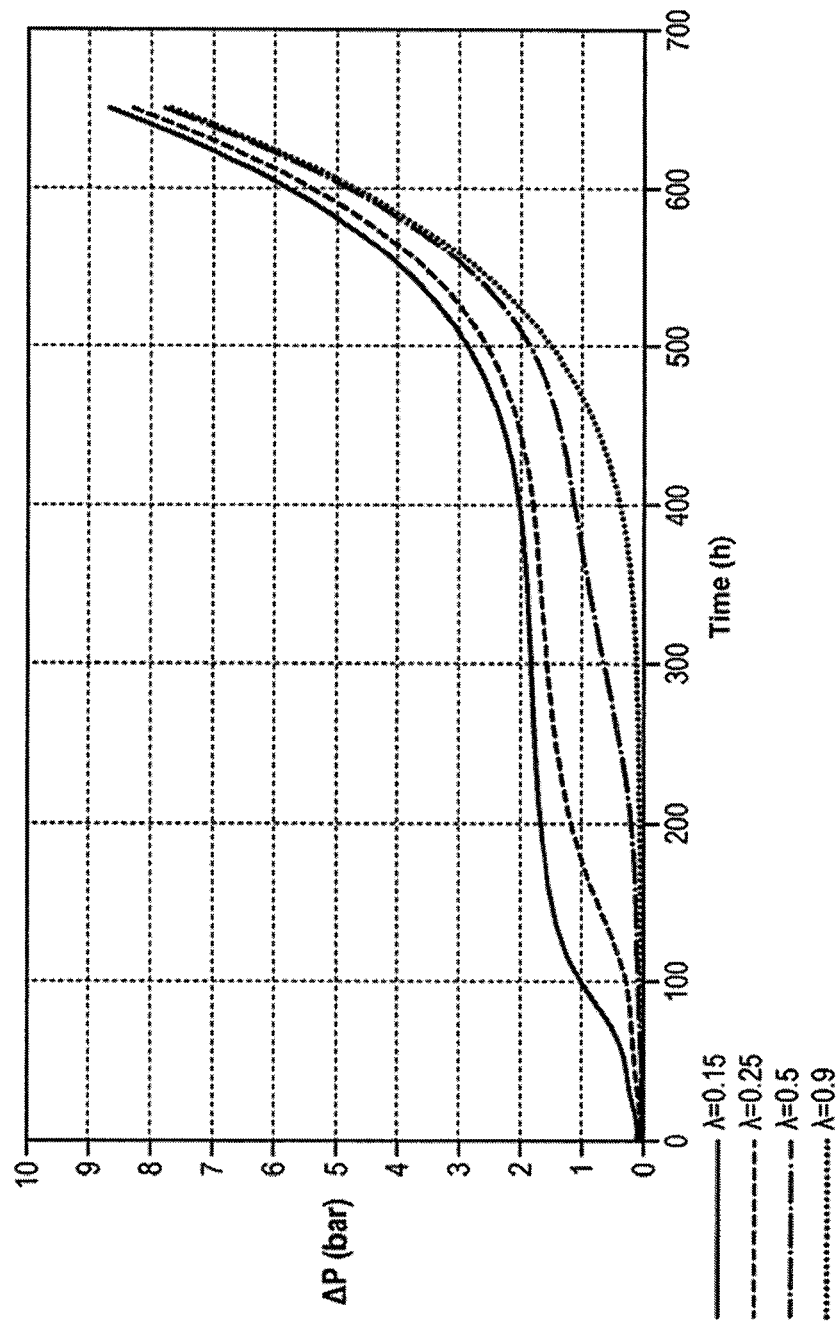

FILTER DEVICE AND SYSTEM AND CLOGGING MONITORING METHOD

FIELD OF THE INVENTION

The invention relates to a particle filter device and system. In addition, the invention relates to a method for monitoring the clogging condition of a particle filter device.

TECHNOLOGICAL BACKGROUND

It is known to filter a fluid by means of a particle filter device.

For this purpose, the filter device generally comprises a filter cartridge comprising one or several filter zone(s) formed by one or several medium/media having a porous structure for retaining the particles present in said fluid.

Over time, the filter zones(s) of the device become eventually clogged. These filter zones must be then cleaned or replaced.

Moreover, in order to be able to carry out the maintenance operations, it may be necessary to know the evolution of the clogging condition of the filter device.

When a particle filter device becomes clogged, the difference in the total pressures between the upstream and downstream $\Delta P$ of the filter device increases as the clogging progresses.

By measuring this pressure difference, or a parameter correlated thereto, as a variation in possibly corrected static pressures, of the dynamic pressure, it is possible to obtain an estimate of the clogging condition of the filter device.

Where appropriate, it is known to post-process the pressure difference measurement in order to take into account the effects of flow rate and temperature of the fluid, which affect the properties of the fluid, and therefore the pressure difference. Clogging models then make it possible to estimate the level of clogging of the filter device under reference conditions.

FIG. 1 represents an example of time evolution of this pressure difference for a conventional particle filter device, with assumptions of constant flow rate, temperature and particle concentration.

As illustrated in FIG. 1, the curve mainly comprises two clogging phases (P1 and P2).

In the first clogging phase P1, the increase of the pressure difference $\Delta P$ is low. In the second clogging phase P2, the increase of the pressure difference $\Delta P$ suddenly becomes very fast.

Because of this characteristic evolution, it turns out that the prediction of the level of clogging is made very difficult in the first phase. It appears indeed that there is little sensitivity of measurement of the pressure difference $\Delta P$ relative to the clogging condition, but also that, in some cases, the level of pressure difference $\Delta P$ can be too small compared to the noise of the measuring instruments. In the second phase, the rapid increase of the pressure difference $\Delta P$ greatly reduces the possible reaction time, especially for the triggering of a maintenance operation, for a replacement of the filter cartridge.

Devices are known including a cartridge which comprises several filter zones operating in parallel, the filter zones having filtration efficiencies that are different from each other. This characteristic makes it possible to increase the lifespan of the device. Indeed, a very efficient first filter zone becomes clogged quickly, whereas a second filter zone, less effective than the first filter zone, becomes clogged more slowly. Once the first filter zone is clogged, the device can still operate thanks to the second filter zone. However, once the first filter zone is clogged, the filter device operates with a degraded efficiency. Such devices therefore are not suitable for use in applications that need to ensure constant filtration efficiency throughout the lifespan of the device.

Other devices are also known including a cartridge which comprises several filter zones having identical filtration efficiencies. These devices generally comprise a valve for directing the fluid stream selectively through the first filter zone or through the second filter zone. In this way, the fluid is initially directed only towards the first filter zone until the latter becomes clogged. Once the first filter zone is clogged, the valve is actuated in order to direct the fluid only towards the second filter zone, which thus takes over from the first filter zone. Such a device makes it possible to maintain substantially constant filtration efficiency. However, it does not allow precise monitoring of the clogging condition of the device. Indeed, it is difficult to anticipate the clogging of the second filter zone for the reasons that have been exposed previously in relation to FIG. 1.

Therefore, the detection of clogging of the filter device is not optimal. There is therefore a need for a filter device of which clogging can be more easily anticipated, while ensuring the same quality of filtration throughout the operation of the filter device.

SUMMARY OF THE INVENTION

An object of the invention is therefore to make more reliable the detection of the clogging condition of a filter device, especially in order to facilitate the operations of maintenance of the device.

According to a first aspect, the invention proposes a particle filter device for filtering a fluid, comprising:
  a fluid inlet,
  a fluid outlet,
  a first fluid flow circuit connecting the fluid inlet to the fluid outlet and comprising a first filter zone having a first filter surface and a first filtration efficiency for a given particle size, and
  a second fluid flow circuit connecting the fluid inlet to the fluid outlet, and comprising:
    a second filter zone having a second filter surface and a second filtration efficiency, identical to the first filtration efficiency, for the given particle size, and
    a constriction having a constant hydraulic resistance so that, in operation, a first portion of the fluid flows through the first flow circuit by passing through the first filter zone and a second portion of the fluid flows through the second flow circuit by passing through the second filter zone and the constriction, and the first filter zone reaches a predetermined clogging condition before the second filter zone.

In such a filter device, the presence of the constriction in the second circuit has the effect of initially orienting the fluid stream mainly through the first circuit. This has the effect that the first filter zone becomes clogged more quickly than the second filter zone, even though these two filter zones have identical filtration efficiencies. Therefore, the pressure difference between the fluid inlet and the fluid outlet increases more quickly and is more easily detectable than in a conventional filter device, which makes it possible to better anticipate the maintenance operations. In addition, as the clogging level of the first filter zone increases, the fluid stream is oriented preferably towards the second circuit. Thus, the second filter zone progressively takes over from the first filter zone, which ensures a constant filtration quality during operation, and similar to that of the filter devices of the prior art.

Advantageously, but optionally, the filter device can comprise the following characteristics, taken alone or in any one of their technically possible combination:

- it comprises a replaceable filter cartridge comprising the first filter zone and the second filter zone, and a casing adapted to contain the filter cartridge and delimiting, with the filter cartridge, the first fluid flow circuit and the second fluid flow circuit,
- the casing comprises the constriction,
- the casing comprises an extension surrounding the filter cartridge, the extension comprising one or several perforation(s) forming the constriction,
- it comprises a central fluid circulation channel surrounded by the first filter zone and by the second filter zone, and the casing comprises an extension extending inside the central fluid circulation channel, the extension comprising one or several perforation(s) forming the constriction,
- a ratio between an area of a section of the perforation or a sum of the areas of the sections of the perforations, and a total area of one face of the extension, is less than 50%, preferably less than 25%,
- in the filter device:
  - the first filter zone comprises a first filter medium,
  - the second filter zone comprises a second filter medium,
    - the filter device further comprising an intermediate flange disposed between the first filter medium and the second filter medium, the intermediate flange comprising:
      - a first face having a first zone in contact with the first filter medium,
      - a second face, opposite to the first face, and having a second zone, in contact with the second filter medium,
      - one of the first or second faces having a third zone which is neither in contact with the first filter medium nor in contact with the second filter medium,
      - one or several perforation(s) forming the constriction,
      - and a ratio between an area of a section of the perforation or a sum of the areas of the sections of the perforations, and an area of the third zone, is less than 50%, preferably less than 25%,
- the casing comprises a side wall surrounding the filter cartridge, the side wall having a general shape of revolution, for example cylindrical shape of revolution or conical shape of revolution,
- the casing comprises a casing head adapted to be assembled with the filter cartridge and having connection nozzles for connecting the fluid inlet and the fluid outlet to fluid circulation ducts,
- it comprises an upper flange, a lower flange, a central fluid circulation channel, a first filter medium surrounding the central channel and a second filter medium surrounding the central fluid circulation channel, the first filter medium and the second filter medium forming respectively the first filter zone and the second filter zone,
- the perforation(s) is/are located outside the central fluid circulation channel,
- the perforation(s) is/are located inside the central fluid circulation channel,
- the constriction is arranged downstream of the second filter zone in the direction of flow of the fluid in the second fluid flow circuit,
- the constriction is arranged upstream of the second filter zone in the direction of flow of the fluid in the second fluid flow circuit,
- a ratio between the first filter surface and the sum of the first and second filter surfaces is ranging between 0.3 and 0.7, preferably between 0.4 and 0.6, for example 0.5,
- it comprises
  - a first replaceable filter cartridge comprising the first filter zone,
  - a second replaceable filter cartridge comprising the second filter zone, and
  - a second connection channel connecting the first filter cartridge and the second filter cartridge, the second connection channel forming the constriction, and
- the filtration efficiencies are ranging between 95% and 100%, preferably between 98% and 99.9%, for example 99.5%, for the given particle size,
- the given particle size is ranging between 2 and 25 microns, and
- the given particle size is ranging between 8 and 50 microns.

The invention also relates to a method for monitoring the clogging condition of a filter device as defined above, comprising the steps of:

- measuring a pressure difference between the fluid inlet and the fluid outlet,
- measuring a temperature of the fluid and a flow rate of the fluid at the fluid inlet,
- determining a clogging condition from the measured pressure difference, fluid temperature and fluid flow rate, and from a reference characteristic curve defining a clogging condition as a function of the pressure difference.

The method may further comprise a step of determining the characteristic curve by subjecting a reference filter device to a circulation of a fluid containing particles with predetermined composition, characteristics and concentration flow rate at predetermined temperature and flow rate, and by measuring an evolution of the pressure difference between the fluid inlet and the fluid outlet over time.

Finally, the invention relates to a filter system for filtering a fluid, comprising a filter device as defined previously, and a module for monitoring the clogging condition of the filter device, the monitoring module being configured to receive signals representative of a pressure difference between the fluid inlet and the fluid outlet, of the temperature and of the fluid flow rate at the fluid inlet, and to determine a clogging condition of the filter device as a function of the pressure difference between the fluid inlet and the fluid outlet, of the temperature and of the fluid flow rate at the fluid inlet.

The invention has many advantages.

The invention proposes a solution providing reliable and robust detection and prediction of the clogging condition of a filter device.

In addition, the invention provides a flexible solution enabling to adjust, from the design of the filter device, the time evolution of the pressure loss through the filter device.

The proposed solution causes little head losses with respect to conventional filter devices having an equivalent total filter surface, which means that the performances of the filter device are maintained almost identically.

Finally, the solution is inexpensive and easily adaptable to the existing filter systems.

DESCRIPTION OF THE DRAWINGS

Other characteristics, objects and advantages of the present invention will become more apparent upon reading the following detailed description, and in the light of the appended drawings given by way of non-limiting examples and in which:

FIGS. 4a to 4d represent examples of a particle filter device comprising a unique replaceable filter cartridge and a casing adapted to receive the filter cartridge;

FIG. 6 represents an example of clogging curves obtained for a filter device of the prior art and for an example of a filter device according to the invention;

FIG. 7 represents various curves of pressure losses as a function of time obtained by simulation for different ratios between the first filter surface and the sum of the first and second filter surfaces, under identical operating conditions.

DETAILED DESCRIPTION

Particle Filter Devices

Figure 1:
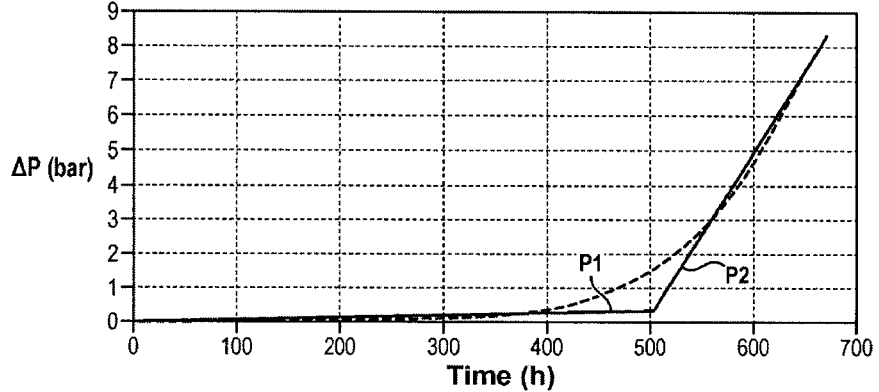
FIG. 1, already commented on, represents a curve of pressure loss as a function of time, for a filter device of the prior art.
Figure 2:
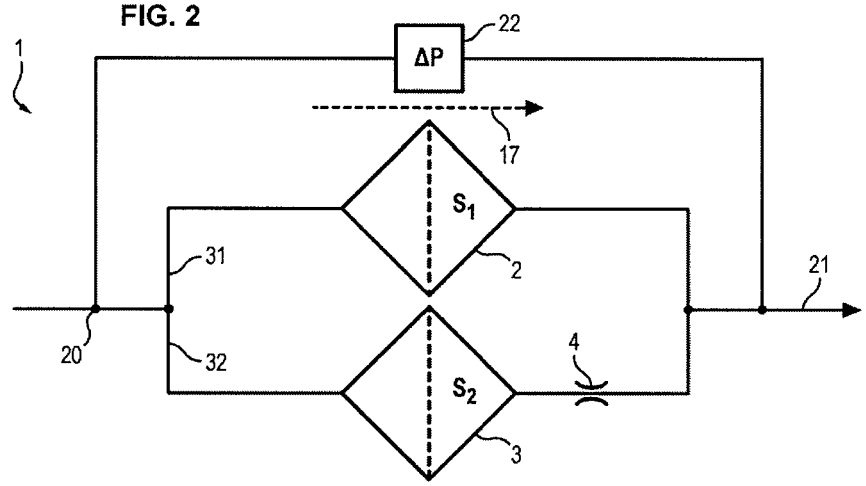
FIG. 2 is a schematic representation of a filter device in accordance with one embodiment of the invention.

FIG. 2 represents an embodiment of a particle filter device 1 for the filtration of a fluid. The fluid is typically a liquid used in aeronautical circuits, for example in fuel circuits, lubricating oil, or hydraulic control oil.

The filter device 1 comprises a fluid inlet 20, a fluid outlet 21, a first fluid flow circuit 31 connecting the fluid inlet 20 to the fluid outlet 21 and a second fluid flow circuit 32 connecting the fluid inlet 20 to the fluid outlet 21. In addition, the first fluid flow circuit 31 comprises a first filter zone 2, and the second fluid flow circuit 32 comprises a second filter zone 3 and a constriction 4 having a given constant hydraulic resistance.

"hydraulic resistance" designates the ratio between the fluid pressure difference created by the constriction 4 between the upstream and downstream of the constriction 4 and the volume flow rate of fluid circulating through the constriction 4. By "constant" is meant that the resistance to the fluid flow through the constriction 4 is independent of the amount of pollutants circulating in the filter device 1 as well as the clogging condition of the filter zones 2, 3.

In operation, the fluid flows through the filter device in a direction of flow 17, which is oriented from the fluid inlet of the filter device 1 towards the fluid outlet 21 of the filter device 1.

A first portion of the fluid flows through the first fluid flow circuit 31 by passing through the first filter zone 2 and a second fluid portion flows through the second fluid flow circuit 32 by passing through the second filter zone 3 and the constriction 4.

The particles of the fluid that must be filtered are for example pollutants.

As illustrated in FIG. 2, the first filter zone 2 has a first filter surface S1, which is the developed surface of a first filter medium 201 of the first zone 2. In a known manner, this filter medium 201 is a porous medium which allows the fluid to flow and retains the particles present in said fluid. The second filter zone 3 has a second filter surface S2, which is the developed surface of a second filter medium 301 of the second zone 3.

The first filter zone 2 furthermore has a first filtration efficiency $E_1$ for a given particle size P, and the second filter zone 3 has a second filtration efficiency $E_2$ for the same given particle size P. In addition, the first filtration efficiency $E_1$ is identical to the second filtration efficiency $E_2$.

Figure 3:
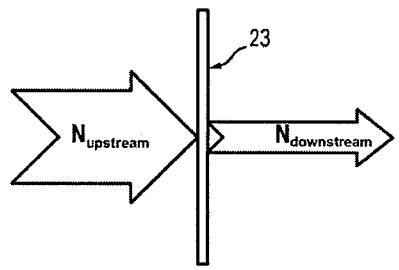
FIG. 3 schematically illustrates the notion of filtration ratio.

The filtration efficiency E is defined by means of a filtration ratio R, for a given particle size P. With reference to FIG. 3, the filtration ratio R of a filter zone 23 is defined, in operation, as the ratio between the number of particles of a given size P, recorded upstream of the filter zone 23, and the number of particles of the same given size P, recorded downstream of said filter zone 23. More precisely, as illustrated in FIG. 3, the filtration ratio R provides the number of particles of a given size P retained by the filter zone 23 in operation, for a given size particle P which is not retained by said filter zone 23. Thereafter, the filtration efficiency E is defined as follows:

$$E = \frac{R-1}{R} * 100$$

where R represents the filtration ratio as described above, the filtration efficiency E is generally expressed as a percentage.

As illustrated in FIG. 3, the filtration ratio R and the filtration efficiency of a filter zone 23 are measured as follows: a fluid containing a number $N_{upstream}$ of particles of the given size P is circulated through said filter zone 23. Once all of the fluid has circulated through said filter zone 23, the number $N_{downstream}$ of particles remaining in the fluid, downstream of the filter zone 23, is recorded. The recording can be performed according to any protocol well known to the person skilled in the art, for example by counting by means of an optical or electromagnetic detector of the particles of a given size P. The filtration ratio R is then provided as follows:

$$R = \frac{N_{upstream}}{N_{downstream}}$$

In the filter device 1, the filtration ratio $R_1$ of the first filter zone 2 is identical compared to the filtration ratio $R_2$ of the second filter zone 3, to within plus or minus 20%. In addition, the filtration efficiencies $E_1$, $E_2$ of the filter zones 2, 3 of the filter device 1 have been measured under the same experimental conditions. More exactly, said filtration efficiencies $E_1$, $E_2$ have been calculated during operations as previously described, using the same parameters (i.e. same fluid, same filtered particles, same temperature, etc.).

Advantageously, the filtration ratios $R_1$, $R_2$ of the filter zones 2, 3 of the filter device 1 are of 200 for the given particle size P. This corresponds to filtration efficiencies $E_1$, $E_2$ ranging between 95% and 100%, preferably between 98% and 99.9%, for example equal to 99.5%. In addition, when the filter device 1 is implemented in lubrication, and/or cooling, and/or hydraulic systems, the given particle size P is ranging between 2 and 25 microns. Similarly, when the filter device 1 is implemented in fuel systems, the given particle size P is ranging between 8 and 50 microns. In any case, the given particle size is ranging between 2 and 50 microns.

The filter zones 2 and 3 are distinct but may belong or not to the same cartridge 15, as explained later.

The constriction 4 may be arranged upstream or downstream of the second filter zone 3, relative to the direction of flow 17 of the fluid. Arranging the constriction 4 downstream of the second filter zone 3 advantageously makes it possible to prevent its pollution by the fluid.

It should be noted that the filter device 1 may comprise a plurality X of filter zones (X>2). In this case, it is possible to arrange a plurality of constrictions 4 upstream or downstream of some of the filter zones $X_i$, the other filter zones $X_{j,j \neq i}$ having no constriction to the flow of the fluid. In addition, the X filter zones each have a filtration efficiency $E_{Xi}$ for the same given particle size P, the filtration efficiencies $E_{Xi}$ being identical to each other.

FIGS. 4a to 4d represent exemplary embodiments of a filter device 1.

In each of these figures, the filter device 1 comprises a replaceable filter cartridge 15 and a casing 16 adapted to contain the filter cartridge 15. The casing 16 comprises a side wall 160 surrounding the filter cartridge 15, the side wall 160 having a general cylindrical or conical shape of revolution.

The casing 16 is surmounted by a casing head 171 adapted to be assembled with the filter cartridge 15 and having connection nozzles 172 for connecting the fluid inlet 20 and the fluid outlet 21 to fluid circulation ducts. The casing 16 delimits, with the filter cartridge 15, the first fluid flow circuit 31 and the second fluid flow circuit 32.

The filter cartridge 15 comprises a first filter zone 2, a second filter zone 3 and a constriction 4. In general, the operations of maintenance of the filter device 1, during the detection of clogging, consist in replacing the filter cartridge 15 by a new filter cartridge 15 which is not clogged.

The filter device 1 further comprises an upper flange 41, a lower flange 42, a central tube 43 connecting the upper 41 and lower 42 flanges together, a first filter medium 201 surrounding the central tube 43 and a second filter medium 301 surrounding the central tube 43, the first filter medium 201 and the second filter medium 301 respectively forming the first filter zone 2 and the second filter zone 3.

The filter device 1 furthermore comprises an intermediate flange 44 disposed between the first filter medium 201 and the second filter medium 301. The intermediate flange 44 comprises one or several perforation(s) 12 forming the constriction 4. The constriction 4 is thus arranged, in the direction of flow 17 of the fluid, between the first filter zone 2 and the second filter zone 3. In addition, the intermediate flange 44 has:

a first face having a first portion 441 in contact with the first filter medium 201, and
  a second face, opposite to the first face, and having a second portion 442, in contact with the second filter medium 301.

On the other hand, one of the first face or of the second face has a third portion 443, which is neither in contact with the first filter medium 201 nor in contact with the second filter medium 301.

The central tube 43 can then be formed in one piece or in two pieces fixed on either side of the intermediate flange 44.

The diameters of the perforations 12 are chosen to avoid clogging of the constriction 4. In addition, the perforation(s) 12 are dimensioned such that a ratio between an area of a section of the perforation 12 or a sum of the areas of the sections of the perforations 12, and an area of the third portion 443, is less than 50%, preferably less than 25%, for example less than 15%. This allows that, in operation, a first portion of the fluid flows through the first flow circuit 31 by passing through the first filter medium 201 and a second portion of the fluid flows through the second flow circuit 32 by passing through the second filter medium 301 and the constriction 4. In this manner, the first filter medium 201 reaches a predetermined clogging condition before the second filter medium 301.

The filter zones 2 and 3 are of revolution, for example of a cylinder-like shape, about an axis of symmetry X-X of the filter device 1, which is the axis of the central tube 43, and are stacked on top of the other.

The central tube 43 delimits a central fluid flow channel 430.

The fluid enters the casing 16 through the inlet 20 and exits through the outlet 21. A first portion of the fluid passes through the first filter zone 2 and exits from the filter device 1. Simultaneously, a second portion of the fluid passes successively through the constriction 4 and the second filter zone 3, but not the first filter zone 2, and then exits from the filter device 1. The distribution of the fluid flow rate between these two zones 2, 3 depends on the time period, as explained subsequently.

As shown in the figures, the fluid can circulate through the cartridge 15 by passing through the filter media 201, 301 by penetrating the outer surface of each filter medium 201, 301, and by exiting through the inner surface of the filter media 201, 301 (FIGS. 4a and 4b). In other words, the fluid passes through the filter media 201, 301 towards the axis of symmetry X-X.

Alternatively, the fluid can circulate through the cartridge 15 by passing through the filter media 201, 301 by penetrating through the inner surface of each filter medium 201, 301, and by exiting through the outer surface of the filter medium 201, 301 (FIGS. 4c and 4d). In other words, the fluid passes through the filter media 201, 301 from the axis of symmetry X-X.

In addition, the constriction 4 can be arranged downstream (FIGS. 4a and 4c) or upstream (FIGS. 4b and 4d) of the second filter zone 3, relative to the direction of flow 17 of the fluid.

Furthermore, the intermediate flange 44 may comprise an extension inside the central circulation channel 430 (FIGS. 4a and 4d), the extension having one or several perforation(s) 12 forming the constriction 4. Alternatively, it is the casing 16, at the inner surface of the bottom of the casing 16, that comprises the extension extending inside the central fluid circulation channel 430 when the filter cartridge 15 is positioned in the casing 16, said extension comprising one or several perforation(s) 12 forming the constriction 4. In this case, it is the ratio between an area of a section of the perforation 12 or a sum of the areas of the sections of the perforations 12, and a total area of a face 443 of the extension of the intermediate flange 44, that extends inside the central circulation channel 430 which is less than 50%, preferably less than 25%, for example less than 15%.

In FIG. 4b, the intermediate flange 44 comprises a protruding extension surrounding the filter cartridge 15, the extension having one or several perforation(s) 12 distributed circumferentially about the axis X-X. The extension is for example a perforated ring extending in protrusion outside the central tube 43, or a protruding flange. Alternatively, it is the casing 16, at its inner surface, that comprises a protruding extension comprising one or several perforation(s) 12 distributed circumferentially about the axis X-X. The position of this extension along the axis of revolution X-X of the casing 16 is calibrated to correspond to the junction between the first filter zone 2 and the second filter zone 3 when the filter cartridge 15 is positioned in the casing 16. In this case, it is the ratio between an area of a section of the perforation 12 or a sum of the areas of the sections of the perforations 12, and a total area of a face 443 of the protruding extension of the intermediate flange 44 that surrounds the filter cartridge, or the protruding extension 443 of the casing 16, which is less than 50%, preferably less than 25%, for example less than 15%.

In these exemplary embodiments, the first filter zone 2 and the second filter zone 3 are connected in parallel between the inlet 20 and the outlet 21 of the filter device 1.

The extensions of the intermediate flange 44, associated with the perforations 12, create a resistance to the flow of fluid upstream or downstream of the second filter zone 3.

Where necessary, one or several seal(s) 25 is/are provided, said seal(s) 25 being for example arranged at the junction with the casing 16 and/or at the junction with the filter media 201 and 301.

A seal 25 may in particular prove necessary if the dimensions of the perforations 12 are of an order comparable to the clearances envisaged without sealing.

The seal 25 is for example an O-ring extending around the extension 12, between the extension 12 and the side wall 160 of the casing 16.

If a seal 25 is required, it is for example carried by the filter cartridge 15, or also by the casing 16, at the same level as the extension 12.

Figure 5:
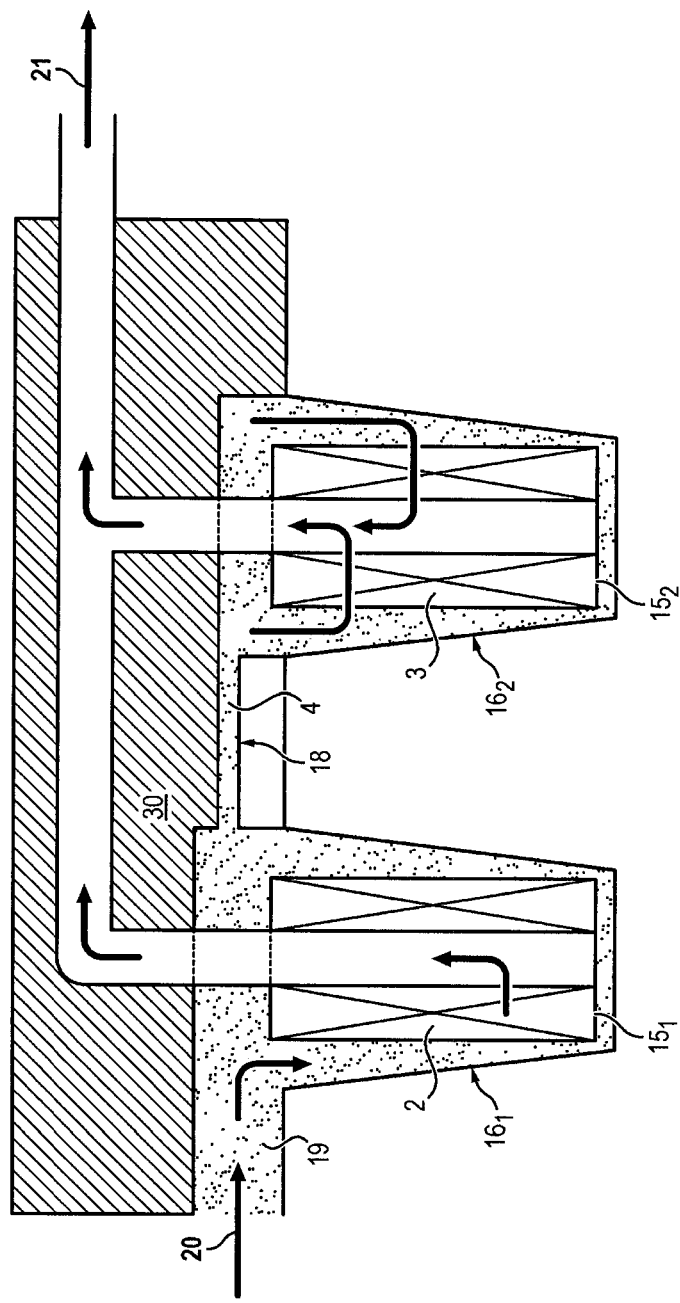
FIG. 5 represents an embodiment of a filter device comprising a constriction in the form of a reduced section channel.

FIG. 5 illustrates another embodiment of a filter device 1 comprising two separate filter cartridges $15_1$ and $15_2$.

The filter device 1 typically comprises:
a first replaceable filter cartridge $15_1$ comprising the first filter zone 2,
a second replaceable filter cartridge $15_2$ comprising the second filter zone 3.

The constriction 4 is arranged in the second flow connection channel 18 connecting the first filter cartridge $15_1$ to the second filter cartridge $15_2$.

The first filter cartridge $15_1$ is for example received in a first casing $16_1$ of the filter device 1, and the second filter cartridge $15_2$ is for example received in a second casing $16_2$ of the filter device 1. The first filter cartridge $15_1$ and the first casing $16_1$ may advantageously have respectively the same shape and be of the same size as the second filter cartridge $15_2$ and the second casing $16_2$. Alternatively, they may be of different size and/or shape.

The casings $16_1$, $16_2$ are generally fixed on the head 30 of the filter device 1, the head 30 also comprising at least one fluid discharge channel 21.

As seen in FIG. 5, in this exemplary embodiment, the fluid circulates through the filter zones 2 and 3 from the radially outer surface towards the radially inner surface of each of the filter zones 2 and 3.

In this exemplary embodiment, the hydraulic resistance of the constriction 4 results from the fact that the first connection channel section 19 upstream of the first filter zone 2 is greater than the second connection channel section 18 upstream of the second filter zone 3.

Operation of the Particle Filter Device

The principle of operation of the filter device 1 can be described as follows.

The filter device 1 makes it possible to obtain a clogging in two stages.

In operation, the filter device 1 is configured to allow a flow of a first portion of the fluid by the first flow circuit 31 by passing through the first filter zone 2, and a second portion of the fluid by the second flow circuit 32 by passing through the second filter zone 3 and the constriction 4.

However, the flow rate of the fluid through these filter zones 2 and 3 is different, despite the identical nature of the first filtration efficiency $E_1$ and the second filtration efficiency E2. The flow rate of the fluid indeed follows the next distribution.

In a first time slot, the filter device 1 allows a flow of the fluid preferably through the first filter zone 2. This preferential flow is induced by the presence of the constriction 4 in the second flow circuit 32. The flow rate of the fluid that passes through the first filter zone 2 is therefore greater than the flow rate of the fluid that passes through the second filter zone 3.

In a second time slot, generally subsequent to the first time slot, the filter device 1 allows a flow of the fluid preferably through the second filter zone 3. This is because, when the clogging of the first filter zone 2 has become such that it offers a hydraulic resistance to the fluid flow greater than that of the constriction 4 and the second filter zone 3, then the fluid flow is preferably oriented through the second filter zone 3. The flow rate of the fluid passing through the second filter zone 3 is therefore greater than the flow rate of the fluid passing through the first filter zone 2.

This operation allows the first filter zone 2 to reach a predetermined clogging condition before the second filter zone 3, the two zones 2 and 3 being continuously functional with the same filtration efficiency $E_1$, $E_2$.

A "clogging condition" of a filter zone is defined as the ratio between an amount of pollutant captured by the zone at a given instant, and a predefined maximum amount of pollutant from which the zone is considered to be clogged. The clogging condition may, for example, be expressed in terms of percentage. A "clogging" can be expressed in terms of amount of pollutants captured per filter surface unit (in $g/dm^2$ for example). It is understood, with this definition, that the more the clogging condition of a filter zone increases, the more the flow rate of the fluid through the zone decreases.

The filter device 1 makes it possible to obtain a clogging in two stages, thanks to a simultaneous exposure of the two filter zones 2 and 3 to the fluid circulating between the inlet 20 and the outlet 21.

The first filter zone 2 (filter surface S1) and the second filter zone 3 (filter surface S2, not necessarily identical to S1) are both exposed, simultaneously, to the fluid circulating through the filter device 1. They are therefore both likely to become clogged.

The filter device can be modeled as follows.

$$S_1+S_2=S_T$$

$$S_1=\lambda S_T$$

$$0<\lambda<1$$

In these equations, $S_T$ is the total surface of an equivalent filter device comprising a unique filter zone.

One of the two surfaces (S1) is favored over the other (S2) which is protected from the stream by the constriction 4. This makes it possible to drop the total pressure of the fluid which is located upstream of the second filter surface S2.

The pressure loss $\Delta P_{constriction}$ through the constriction 4 has a (quadratic) evolution as a function of the volume flow rate through the second filter zone 3, or in an equivalent manner, as a function of the speed ($v_2$) of passage of the fluid through the second filter zone 3.

$$\Delta P_{constriction} = \frac{\rho v_2^2}{2} \times \xi_{constriction}(Re), \text{ with:}$$

ρ: density of the fluid (kg·m⁻³);
$v_2$: fluid velocity (m·s⁻¹)
$\xi_{constriction}$: hydraulic head loss coefficient of the brake The coefficient $\xi_{constriction}$ characterizes the dissipation of mechanical energy of the fluid in the form of heat at passage of the constriction 4, and depends on the geometry of the constriction 4 and on the Reynolds number of the flow of the fluid through the constriction 4.

The operation of the filter device 1 will be described in more detail in an example in which S1=S2. This example is however not restrictive.

In a first time slot, the fluid entering the filter device 1 is preferably oriented towards the first filter zone 2.

It is noted that the flow rate of the fluid through the first filter zone 2 is greater than the average flow rate that would be observed on a unique reference surface $S_T$ ($S_T$=S1+S2).

Consequently, the clogging of the first filter zone 2 will more quickly cause a significant pressure difference value ΔP, for two reasons: firstly, the supply of particles is greater than the average density observed for a single surface $S_T$, and secondly the flow rate of the fluid at this first filter zone 2 is greater than the average flow rate observed for a single surface ST.

A faster increase in the pressure loss ΔP between the inlet 20 and the outlet 21 of the filter device 1 is obtained, which makes it possible to record the initial and average values of the global pressure difference pressure loss ΔP between the fluid inlet 20 and outlet 21.

FIG. 6 represents clogging curves obtained with two different filter devices, one comprising a constriction 4 according to an exemplary embodiment of the invention, and the other being a conventional device in accordance with the prior art. These clogging curves provide the evolution of pressure losses ΔP through each filter device as a function of the mass of pollutant captured by the filter device.

As can be seen, the curve obtained for a filter device 1 according to an exemplary embodiment of the invention has a more regular and less abrupt increase than the curve associated with the conventional filter devices of the prior art, for an identical filtration efficiency. The detection of clogging is thus facilitated.

The more the level of clogging increases in the first filter zone 2 the more the second filter zone 3 becomes conducive to flow. Indeed, due to the progressive clogging of the first filter zone 2, the fluid tends to be preferably directed towards the second filter zone 3 despite the presence of the constriction 4. As the first filter zone 2 becomes clogged, the flow rate of the fluid through the second filter zone 3 increases, and thus ends up becoming greater than the flow rate of the fluid through the first filter zone 2, which decreases.

Gradually, the second filter zone 3 also becomes clogged.

Continuously, an imbalance of the system is therefore achieved which makes it possible to linearize the clogging curve that provides the pressure difference ΔP as a function of time, the pressure difference ΔP being directly correlated with the clogging density. This linearization is illustrated in FIG. 6.

Once the two filter zones 2 and 3 are clogged, the head loss level $\Delta P_{max}$ is substantially equal to the one that would have been observed with a filter device having a unique filter surface $S_T$, which allows keeping good performance of autonomy (i.e. of retaining capacity of the filter device 1) while obtaining a more linear and reliable system, since it is not necessary to use movable parts likely to increase the modes and probabilities of failure of the filter device and system.

Calibration of the Filter Device

It is possible to calibrate the filter device 1 in order to meet specifications. The specifications can especially relate to the time evolution of the pressure loss of the fluid through the filter device 1, which is the curve generally used to detect the clogging of the filter device 1. The specifications may also comprise a maximum value of pressure loss $\Delta P_{max}$ when the filter device 1 is completely clogged, or after a predetermined time period.

The calibration of the filter device 1 can be carried out as follows.

It emerges from the modeling of the operation of the filter device 1 that different parameters affect the clogging curve, for a given fluid and given experimental conditions, and especially:
  the filter surface S1 of the first filter zone 2;
  the filter surface S2 of the second filter zone 3;
  the hydraulic resistance of the constriction 4.

The hydraulic resistance of the constriction 4 depends on geometric parameters of the constriction 4. For example, in the case of an extension comprising perforations 12, the number and the diameter of the perforations 12 condition the resistance to flow. In the case of a channel 18 with reduced section, the section of the channel conditions the resistance to flow.

The clogging curve can be computer simulated for a given filter device. It is therefore possible to meet the time specifications by performing iterations on one or more of the aforementioned parameters.

For example, in FIG. 7, several clogging curves were simulated for different surface ratio values $$\lambda = \frac{S_1}{S_T},$$

for a given fluid and under given experimental conditions.

In FIG. 7, the solid line curve C1 corresponds to λ=0.15, the long dotted line curve C2 corresponds to λ=0.25, the long and short alternating dotted line curve C3 corresponds to λ=0.5 and the short dotted line curve C4 corresponds to λ=0.9.

For this filter device, the curve C3 has the most optimal profile. Indeed, it does not present too abrupt variations. In addition, it does not introduce additional pressure loss when the filter device 1 is completely clogged.

Method for Monitoring a Clogging Condition

The filter device 1 is implemented to filter a fluid containing particles.

It is therefore useful to be able to monitor the clogging condition of the device 1 during its operation, so as to predict the maintenance operations or detect an unusual event within the hydraulic circuit. Such an event may be for example the breakage of an aeronautical circuit component resulting in the sudden discharge of a large amount of particles within the fluid.

The clogging of the filter device 1 can be detected by measuring the pressure loss ΔP through the filter device 1 (between the fluid inlet 20 and the fluid outlet 21) as a function of time.

The relation between the pressure loss ΔP and the clogging of the filter device 1 is expressed by a clogging model. This model is known from the design of the filter device 1 and can be supplied by the manufacturer. This model provides especially a reference characteristic curve defining a clogging condition as a function of the pressure difference ΔP and as a function of the fluid temperature and a fluid flow rate at the fluid inlet. This model can finally be the result of a calibration of the filter device 1.

It is also possible to provide a preliminary step of determining the characteristic curve by subjecting a reference filter device 1 to a circulation of a fluid containing particles with predetermined composition, characteristics, and concentration ratio at predetermined temperature and flow rate, and by measuring an evolution of the pressure difference between the fluid inlet and the fluid outlet over time.

Thus, a method for monitoring a clogging condition of a filter device 1 may comprise the steps of:
measuring a pressure difference between the fluid inlet and the fluid outlet,
measuring a fluid temperature and a fluid flow rate at the fluid inlet, and
determining a clogging condition from the measured pressure difference, temperature and fluid flow rate, and from a reference characteristic curve defining a clogging condition as a function of the pressure difference.

Particle Filter System

A system for monitoring a clogging condition of the filter device 1 may comprise, in addition to the device 1, a module for monitoring the clogging condition of the filter device 1, the monitoring module being configured to receive a signal representative of a pressure difference between the fluid inlet 20 and the fluid outlet 21 and to determine a clogging condition of the filter device 1 as a function of the pressure difference. This determination is permitted by comparison with a reference characteristic curve defining a clogging condition as a function of the pressure difference. This curve may be provided by the manufacturer or previously determined by the user, during a calibration step of the filter device 1 or not.

The previously described clogging condition monitoring module may also be configured to receive signals representative of the temperature and flow rate of the fluid at the fluid inlet 20, and to take into account the temperature and flow rate of the fluid in determining the clogging condition.

In any event, the monitoring module of the monitoring system is configured to implement the method for monitoring the clogging condition of the device 1, as previously described.

The invention has many applications, especially in the field of aeronautics, or in any other technical field requiring a particle filter device the clogging of which must be detected.

The invention claimed is:

1. A particle filter device for filtering a fluid comprising:
a fluid inlet,
a fluid outlet,
a first fluid flow circuit connecting the fluid inlet to the fluid outlet and comprising a first filter zone having a first filter surface and a first filtration efficiency for a given particle size, the first filter zone comprising a first filter medium, and
a second fluid flow circuit connecting the fluid inlet to the fluid outlet, and comprising:
a second filter zone having a second filter surface and a second filtration efficiency, identical to the first filtration efficiency, for the given particle size, the second filter zone comprising a second medium, and
a constriction having a constant hydraulic resistance so that, in operation, a first portion of the fluid flows through the first flow circuit by passing through the first filter zone and a second portion of the fluid flows through the second flow circuit by passing through the second filter zone and the constriction, and the first filter zone reaches a predetermined clogging condition before the second filter zone,
wherein the first filter zone has a first filtration ratio and the second filter zone has a second filtration ratio identical to the first filtration ratio, wherein the filtration ratio of a filter zone corresponds to a ratio between a number of particles of a given size, recorded upstream of said filter zone, and a number of particles of the same given size, recorded downstream of said filter zone,
wherein the filter device comprises an intermediate flange disposed between the first filter medium and the second filter medium, the intermediate flange comprising:
a first face having a first portion in contact with the first filter medium,
a second face, opposite to the first face, and having a second portion, in contact with the second filter medium,
one of the first or second faces having a third portion which is neither in contact with the first filter medium nor in contact with the second filter medium,
at least one perforation forming the constriction,
and wherein a ratio between an area of a section of the perforation or a sum of the areas of sections of the perforations and an area of the third portion, is less than 50%.

2. The filter device according to claim 1, comprising a replaceable filter cartridge comprising the first filter zone and the second filter zone, and a casing adapted to contain the filter cartridge and delimiting, with the filter cartridge, the first fluid flow circuit and the second fluid flow circuit.

3. The filter device according to claim 2, wherein the casing comprises the constriction.

4. The filter device according to claim 3, wherein the casing comprises an extension surrounding the filter cartridge, the extension comprising one or several perforation(s) forming the constriction.

5. The filter device according claim 4, wherein a ratio between an area of a section of the perforation or a sum of the areas of the sections of the perforations, and a total area of a face of the extension, is less than 50%.

6. The filter device according to claim 3, comprising a central fluid circulation channel surrounded by the first filter zone and by the second filter zone, and wherein the casing comprises an extension extending inside the central fluid circulation channel, the extension comprising one or several perforation(s) forming the constriction (4).

7. The filter device according to claim 6, wherein a ratio between an area of a section of the perforation or a sum of the areas of the sections of the perforations, and a total area of a face of the extension, is less than 50%.

8. The filter device according to claim 2, wherein the casing comprises a side wall surrounding the filter cartridge, the side wall having a general shape of revolution, for example cylindrical shape of revolution or conical shape of revolution.

9. The filter device according to claim 2, wherein the casing comprises a casing head adapted to be assembled with the filter cartridge and having connection nozzles for connecting the fluid inlet and the fluid outlet to fluid circulation ducts.

10. The filter device according to claim 1, wherein the constriction is arranged downstream of the second filter zone in the direction of flow of the fluid in the second fluid flow circuit.

11. The filter device according to claim 1, wherein the constriction is arranged upstream of the second filter zone in the direction of flow of the fluid in the second fluid flow circuit.

12. The filter device according to claim 1, wherein the ratio between the first filter surface and the sum of the first and second filter surfaces is ranging between 0.3 and 0.7.

13. The filter device according to claim 1 comprising:
a first replaceable filter cartridge comprising the first filter zone,
a second replaceable filter cartridge comprising the second filter zone, and
a second connection channel connecting the first filter cartridge and the second filter cartridge, the second connection channel forming the constriction.

14. The filter device according to claim 1, wherein the filtration efficiencies are ranging between 95% and 100%.

15. The filter device according to claim 1, wherein the given particle size is ranging between 2 and 25 microns.

16. The filter device according to claim 1, wherein the given particle size is ranging between 8 and 50 microns.

17. A method for monitoring the clogging condition of a filter device according to claim 1, comprising the steps of:
measuring a pressure difference between the fluid inlet and the fluid outlet,
measuring a temperature of the fluid and a flow rate of the fluid at the fluid inlet, and
determining a clogging condition from the measured pressure difference, fluid temperature and fluid flow rate, and from a reference characteristic curve defining a clogging condition as a function of the pressure difference.

18. The method according to claim 17, further comprising a prior step of determining the characteristic curve by subjecting a reference filter device to a circulation of a fluid containing particles with predetermined composition, characteristics and concentration flow rate at predetermined temperature and flow rate, and by measuring an evolution of the pressure difference between the fluid inlet and the fluid outlet over time.

19. A filter system for the filtration of a fluid, comprising a filter device according to claim 1, and a module for monitoring the clogging condition of the filter device, the monitoring module being configured to receive signals representative of a pressure difference between the fluid inlet and the fluid outlet, of the temperature and of the fluid flow rate at the fluid inlet, and to determine a clogging condition of the filter device as a function of the pressure difference between the fluid inlet and the fluid outlet, of the temperature and of the fluid flow rate at the fluid inlet.

20. A filter system for the filtration of a fluid, comprising a particle filter device for filtering a fluid comprising:
a fluid inlet,
a fluid outlet,
a first fluid flow circuit connecting the fluid inlet to the fluid outlet and comprising a first filter zone having a first filter surface and a first filtration efficiency for a given particle size, the first filter zone comprising a first filter medium, and
a second fluid flow circuit connecting the fluid inlet to the fluid outlet, and comprising:
a second filter zone having a second filter surface and a second filtration efficiency, identical to the first filtration efficiency, for the given particle size, the second filter zone comprising a second filter medium, and
a constriction having a constant hydraulic resistance so that, in operation, a first portion of the fluid flows through the first flow circuit by passing through the first filter zone and a second portion of the fluid flows through the second flow circuit by passing through the second filter zone and the constriction, and the first filter zone reaches a predetermined clogging condition before the second filter zone,
wherein the filter device further comprises an intermediate flange disposed between the first filter medium and the second filter medium, the intermediate flange comprising:
a first face having first portion in contact with the first filter medium,
a second face, opposite to the first face, and having a second portion, in contact with the second filter medium,
one of the first or second faces having a third portion which is neither in contact with the first filter medium nor in contact with the second filter medium,
at least one perforation forming the constriction,
wherein a ratio between an area of a section of the perforation or a sum of the areas of the sections of the perforations and an area of the third portion, is less than 50%,
wherein the filter system further comprises a module for monitoring the clogging condition of the filter device, the monitoring module being configured to receive signals representative of a pressure difference between the fluid inlet and the fluid outlet, of the temperature and of the fluid flow rate at the fluid inlet, and to determine a clogging condition of the filter device as a function of the pressure difference between the fluid inlet and the fluid outlet, of the temperature and of the fluid flow rate at the fluid inlet, wherein the clogging condition of the filter device is determined from comparison with a reference characteristic curve defining a clogging condition as a function of the pressure difference.

* * * * *